6 Sheets—Sheet 1.

T. W. & W. K. APPLEYARD.
FLESHING-MACHINES FOR HIDES AND SKINS.

No. 192,479. Patented June 26, 1877.

WITNESSES

INVENTORS

6 Sheets—Sheet 2.

T. W. & W. K. APPLEYARD.
FLESHING-MACHINES FOR HIDES AND SKINS.

No. 192,479. Patented June 26, 1877.

WITNESSES

INVENTORS

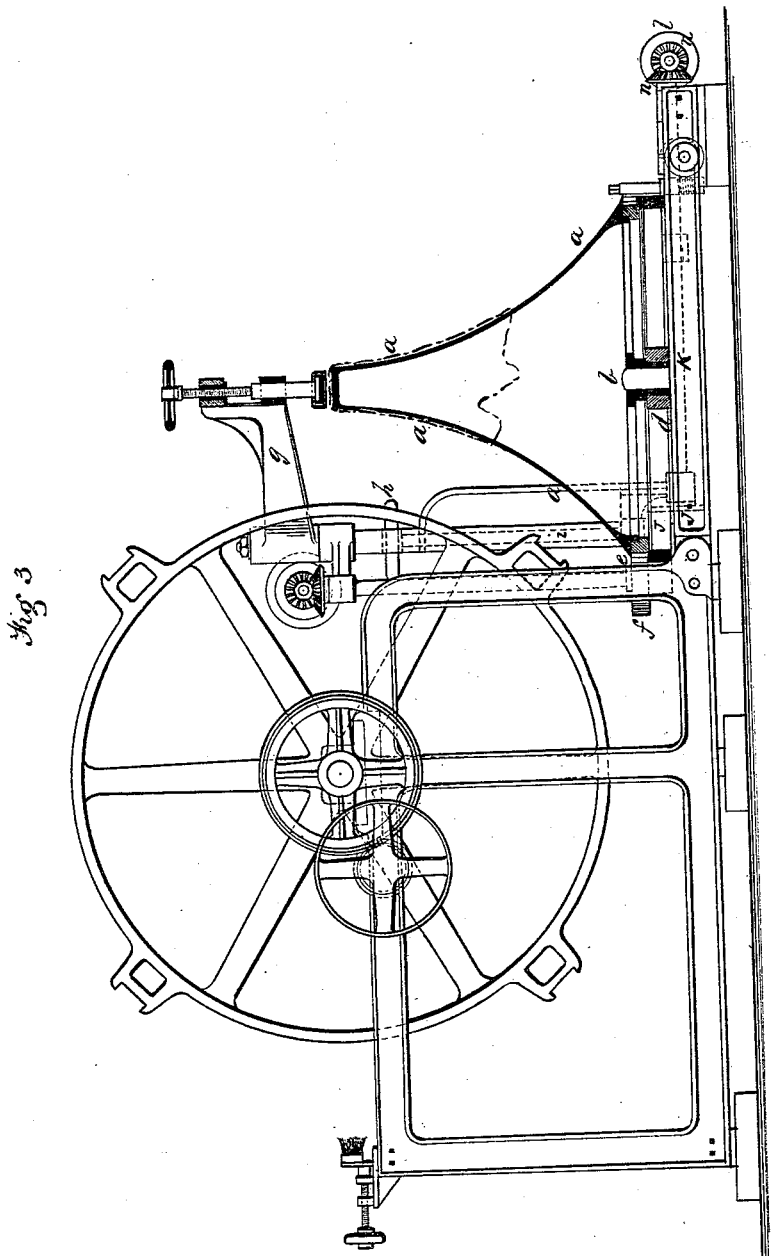

6 Sheets—Sheet 4.
T. W. & W. K. APPLEYARD.
FLESHING-MACHINES FOR HIDES AND SKINS.
No. 192,479. Patented June 26, 1877.
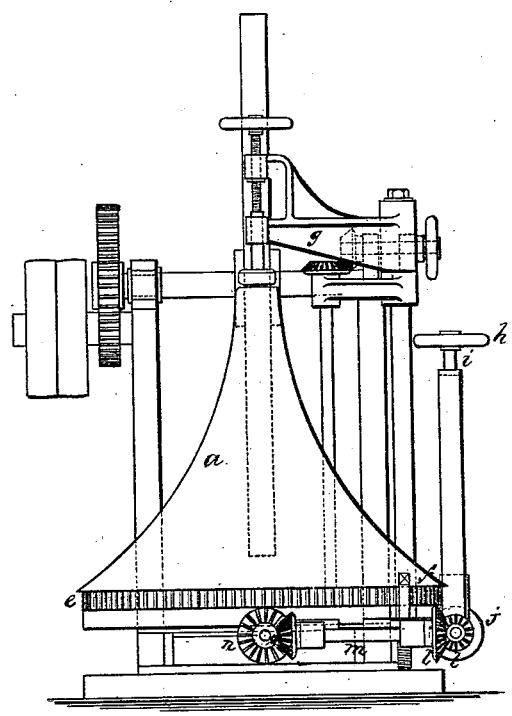
WITNESSES
INVENTORS 6 Sheets—Sheet 5.
T. W. & W. K. APPLEYARD.
FLESHING-MACHINES FOR HIDES AND SKINS.
No. 192,479. Patented June 26, 1877.
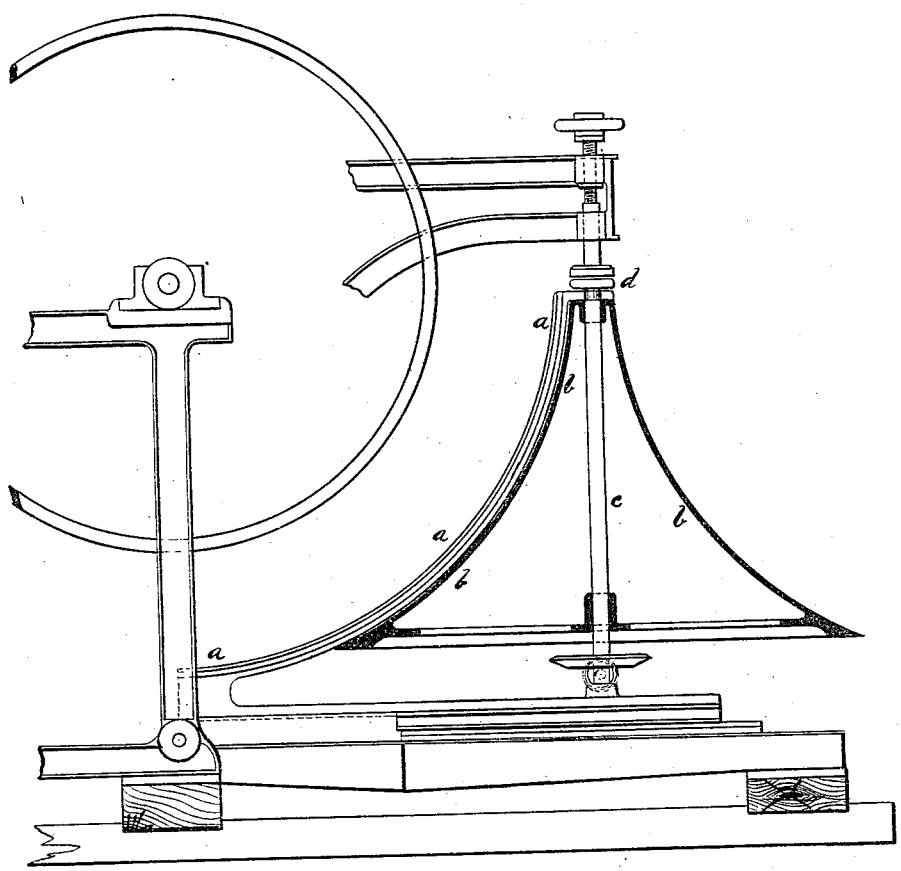

6 Sheets—Sheet 6.

T. W. & W. K. APPLEYARD.
FLESHING-MACHINES FOR HIDES AND SKINS.

No. 192,479. Patented June 26, 1877.

WITNESSES
INVENTORS

UNITED STATES PATENT OFFICE.

THOMAS WADE APPLEYARD AND WALTER KNAPP APPLEYARD, OF HUNSLET CARR, NEAR LEEDS, ENGLAND.

IMPROVEMENT IN FLESHING-MACHINES FOR HIDES AND SKINS.

Specification forming part of Letters Patent No. 192,479, dated June 26, 1877; application filed April 9, 1877. Patented in England, June 20, 1876, for 14 years.

*To all whom it may concern:*

Be it known that we, THOMAS WADE APPLEYARD and WALTER KNAPP APPLEYARD, both of Hunslet Carr, near Leeds, in the county of York, England, have invented Improvements in Fleshing-Machines, such machinery or apparatus being also applicable for other operations required in the manufacture of leather, of which the following is a specification:

Our invention is particularly applicable for fleshing hides, but may also be used, with slight modifications, for unhairing, scudding, and scouring, and is as hereinafter described, reference being had to the accompanying drawings, and to the letters and marks thereon.

Figure 1:
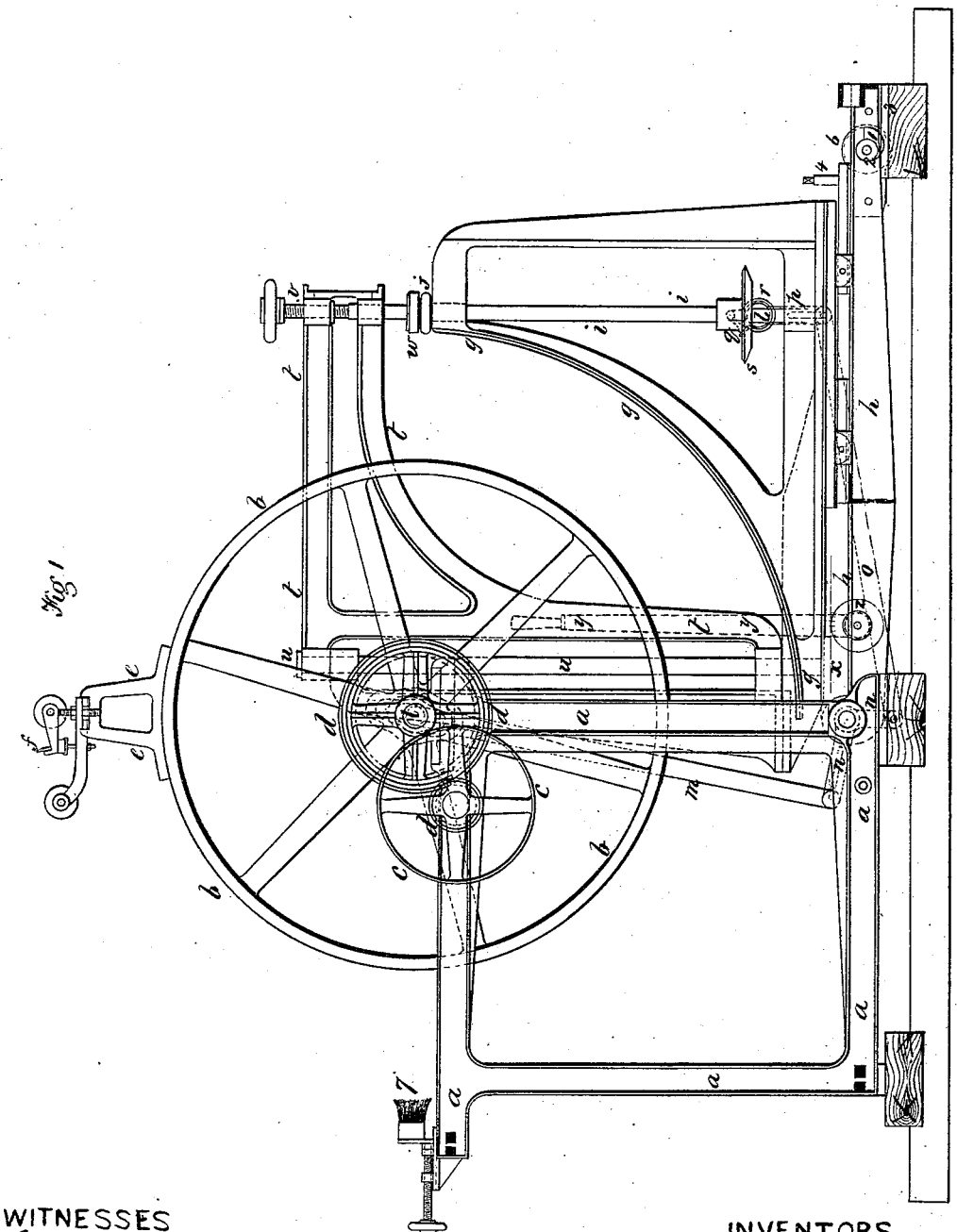
Figure 2:
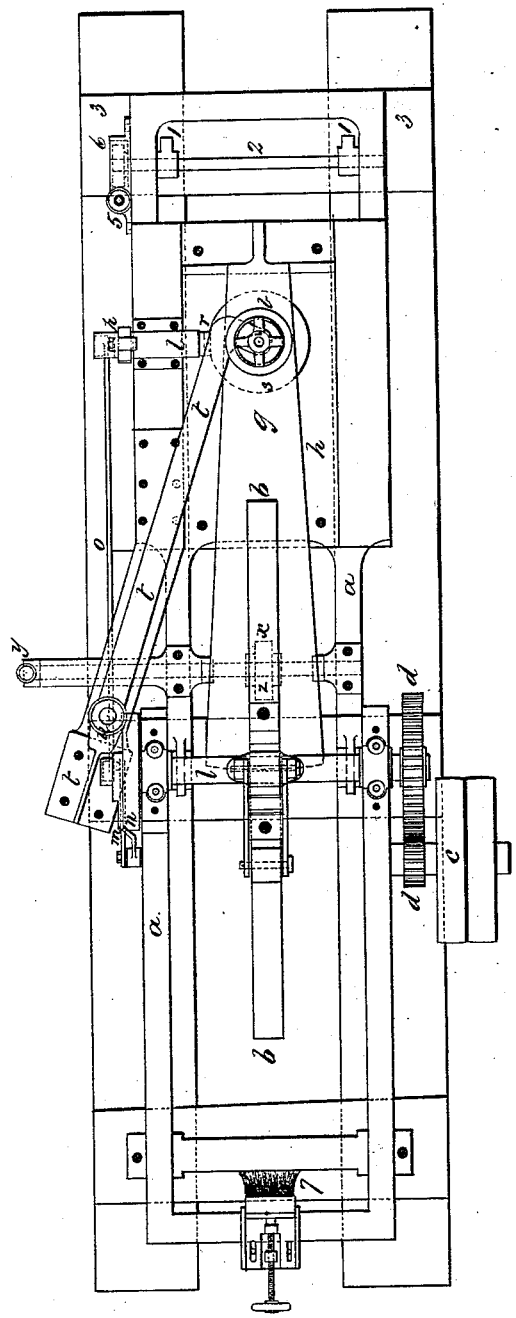

Figure 1 represents a side elevation; Fig. 2, a plan looking at the top.

Between suitable frame-work or standards $a$ we mount a wheel or disk, $b$, in suitable bearings, to which a rotary motion is given through pulley $c$ and gearing $d$ from some suitable motive power. On the periphery of this wheel or disk $b$ is or are fitted one or more adjustable brackets, $e$. These brackets $e$, when preferred, may be cast on; and, when employed for fleshing purposes, knives or scrapers $f$ are provided on these brackets $e$. These knives or scrapers $f$ are more particularly shown at Figs. 6 and 7, 8 and 9, and will be described hereinafter. $g$ is the beam, which is curved in front to suit the circle described by the cutters or scrapers $f$, and fitted so as to slide freely on the bed-plate $h$. To this beam $g$ no radial motion is given, but in order to give a traversing movement to the hide in front of the cutters $f$ we provide a shaft, $i$, on the top of which is provided the boss $j$, over which the hide is thrown, similar to that shown in dotted lines at $k$. An intermittent rotary motion is imparted to this shaft $i$ by means of a crank, cam, or its equivalent, provided on the disk-shaft $l$, and transmitted through rod $m$, bell-crank lever $n$, rod $o$, ratchet-lever $p$, pawl $q$, ratchet-wheel $r$, and bevel-wheel $s$.

In order to prevent the hide being drawn off the beam $g$ we attach to the frame-work $a$ a swinging arm or bracket, $t$, which is coupled thereto by means of the rod $u$. At the outer end of this swinging bracket $t$ we provide the hand-screw $v$, by which the pressure-plate $w$ may be raised or lowered by the attendant.

After the hide has been placed in position on the beam $g$ the swing-bracket $t$ is brought into the position shown on drawing, having the pressure-plate $w$ directly over the boss $j$. When in this position it may be screwed tightly down, the hide being between it and the boss $j$. In this position the hide is held firmly, thereby preventing it being drawn off by the cutters $f$. At the same time the intermittent motion of the shaft $i$ carries round the hide in front of the cutters $f$, so that the whole of the hide can be operated upon thereby, the pressure-plate $w$ turning round with the hide.

Underneath the beam $g$, or in any convenient position thereon, we provide a rack, $x$, through which the beam $g$ may be moved toward the cutters $f$, or from them. By this means the attendant may regulate the distance to suit the unevenness of the hide. This adjustment is imparted by the attendant through hand-lever $y$ and rack-pinion $z$. The beam $g$ may be adjusted in an oblique direction by means of the cams 1 mounted on the shaft 2. By turning the cams 1, which rest on the plate 3, the back of the beam $g$ may be raised or lowered, thereby adjusting it in an oblique direction. The movement of the cams 1 is effected by the attendant through upright shaft 4, worm 5, and worm-wheel 6.

We provide for the purpose of cleaning the cutter $f$ while in operation either an adjustable brush, 7, or any other equivalent means.

Figs. 3 and 4 represent a modification of machinery constructed according to our invention, and are, respectively, a front elevation and part section, and an end elevation.

In this arrangement we make the beam $a$, by preference, round, and curved in its length to suit the circle described by the cutters, and they may be caused to revolve either by power or by hand, being carried in suitable bearings $b$ on the saddle $d$, the rotary motion being transmitted thereto through circular rack $e$, rack-pinion $f$, from some suitable motive power. We also employ a swinging arm or bracket, $g$, which is of a similar construction to that shown and described with reference to Figs. 1 and 2.

The adjustment of the beam $a$ to and from the cutters is effected by the attendant through hand-wheel $h$, shaft $i$, bevel-wheels $j$, shaft $k$, bevel-wheels $l$, shaft $m$, bevel-wheel $n$, adjusting-screw $o$, and nut $p$, which is attached to the saddle $d$. Other parts of the machine are of a similar construction to that shown and described with reference to Figs. 1 and 2.

Fig. 5 represents a part side elevation and section of another modification, and is a combination of the stationary and rotary beams shown and described with reference to Figs. 1, 2, 3, and 4.

$a$ represents the stationary beam and $b$ the rotary beam. By this arrangement of rotary beam $b$ and stationary beam $a$ the hide, by its adhesion to the rotary beam, is carried round more regularly than when the upright revolving shaft $c$ and boss $d$ are alone used with the stationary beam; at the same time the addition of the stationary beam causes a greater width of hide to be operated upon at one time than when the rotary beam is alone employed. Other parts of the machine, not shown or described, may be of a similar construction as those shown at Figs. 1 and 2.

Figs. 6 and 7, 8 and 9, show, respectively, elevations and plans of two arrangements of cutting or scraping apparatus in accordance with our invention.

Figure 6:
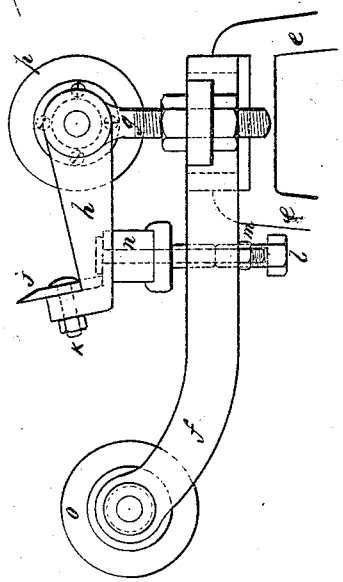
Figure 7:
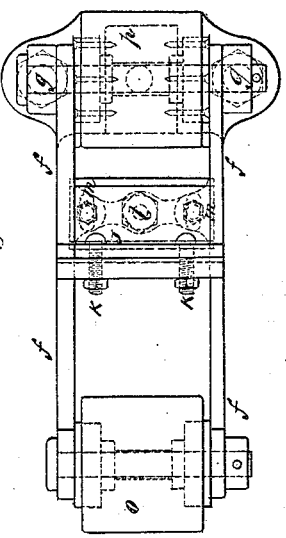

In Figs. 6 and 7, $e$ is the bracket provided on the periphery of the wheel or disk on Figs. 1 and 2. On this is mounted and fixed an arm, $f$. To this is attached, by means of an adjustable support, $g$, the cutter-carriage $h$, which is coupled thereto by means of the pin $i$. The cutter $j$ is fixed upon the cutter-carriage $h$ by means of the bolts $k$. In order to regulate or set the cutters, so that they all have equal projections, we provide the adjusting-screw $l$, whereby the carriage containing the cutter may be moved outward or inward, when required. After the cutter has been set by means of the adjusting-screw the side bolts $m$ are used for retaining it in position. Between the set-screws $l$ and the carriage $h$ we provide a packing of india-rubber, as shown at $n$, or, when preferred, a spiral spring or its equivalent may be employed. This arrangement allows the cutters to adapt themselves to the various thicknesses or irregularities of the hide. On the arm $f$ is provided a roller, $o$, and on the adjustable support $g$ is provided the roller $p$. The front roller $p$ is for pressing out the wrinkles or unevenness of the hide, and the back roller $o$ is to steady the hide after the cutter has passed over it.

Figure 8:
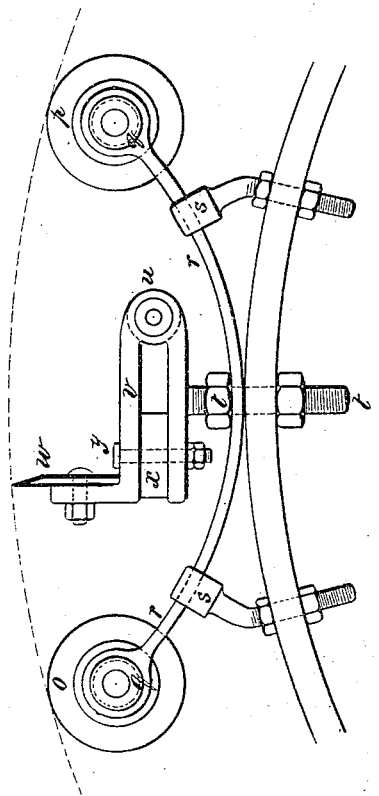
Figure 9:
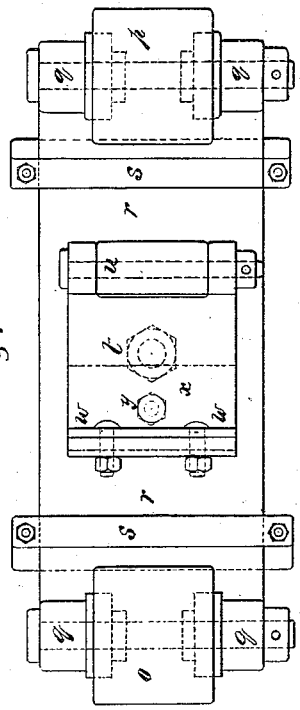

Figs. 8 and 9 show another arrangement of cutting or scraping apparatus, made according to our invention. The rollers $o$ and $p$ are mounted in bearings $q$ on the curved spring $r$, to which the adjustable eyes $s$ are provided as stays. The spring $r$ is secured on the periphery of the wheel, as shown, by means of the adjustable support $t$, on which is hinged at $u$ the cutter-carriage $v$ carrying the cutter $w$. Between the adjustable support $t$ and the cutter-carriage $v$ is provided an india-rubber packing, $x$, or spiral spring, to allow for the irregularities of the hide. The projection of the cutters is regulated by the bolt $y$.

For the cutters or scrapers herein described other known tools or apparatus for unhairing, scudding, and scouring may be used.

Having now described the nature of our said invention, and shown by drawings how the same may be carried into practice, we would have it understood that we do not limit ourselves to the exact limits or configuration of the various parts we have expressed and shown; but

We claim—

1. In combination with the revolving scraper and curved beam that supports the hide, the swinging arm and clamp to hold the hide at the upper part of the curved beam, substantially as set forth.

2. The combination, with the revolving scraper, of a rotary conoidal support for the hide, the section of which support is a curved line corresponding to the path described by the revolving scrapers, substantially as set forth.

3. The combination, with the scraper in the machine for fleshing hides, of a roller in advance of the scraper, and moving with it, substantially as set forth.

T. W. APPLEYARD.
W. K. APPLEYARD.

Witnesses to the signature of THOMAS WADE APPLEYARD and WALTER KNAPP APPLEYARD:
J. W. HARDING,
WM. FAIRBURN HART.